(12) United States Patent
Winters

(10) Patent No.: US 10,926,468 B2
(45) Date of Patent: Feb. 23, 2021

(54) CONVECTION SYSTEM

(71) Applicant: Hewlett-Packard Development Company, L.P., Spring, TX (US)

(72) Inventor: William Winters, Sumner, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 196 days.

(21) Appl. No.: 16/326,074

(22) PCT Filed: Sep. 6, 2016

(86) PCT No.: PCT/US2016/050388
§ 371 (c)(1),
(2) Date: Feb. 15, 2019

(87) PCT Pub. No.: WO2018/048384
PCT Pub. Date: Mar. 15, 2018

(65) Prior Publication Data
US 2019/0184640 A1 Jun. 20, 2019

(51) Int. Cl.
*B29C 64/295* (2017.01)
*B41J 29/377* (2006.01)
*B33Y 40/00* (2020.01)
*B29C 64/209* (2017.01)

(52) U.S. Cl.
CPC ......... *B29C 64/295* (2017.08); *B29C 64/209* (2017.08); *B33Y 40/00* (2014.12); *B41J 29/377* (2013.01)

(58) Field of Classification Search
CPC .... B29C 64/295; B29C 64/209; B41J 29/377; B33Y 40/00
See application file for complete search history.

(56) References Cited

U.S. PATENT DOCUMENTS

| 5,278,936 A | 1/1994 | Shao |
| 5,347,610 A * | 9/1994 | Lee ...................... D06F 39/045 |
| | | 392/447 |
| 5,467,119 A | 11/1995 | Richtsmeier et al. |
| 5,568,586 A | 10/1996 | Junk |
| 5,592,139 A | 1/1997 | Trayer et al. |
| 6,059,406 A | 5/2000 | Richtsmeier et al. |

(Continued)

FOREIGN PATENT DOCUMENTS

| CN | 2684093 Y | 3/2005 |
| CN | 201018269 Y | 2/2008 |

(Continued)

*Primary Examiner* — Nahida Sultana
(74) *Attorney, Agent, or Firm* — Fabian VanCott

(57) ABSTRACT

A convection system includes a housing, a chimney defined in the housing to pass fluid into and out of the housing, and a fan rotatably coupled to the housing to create a pressure differential within the housing to pass the fluid into the housing. The convection system also includes a heating element located in juxtaposition to the fan to heat the fluid passed into the housing via the chimney, and a thermal fuse located at an orifice of the chimney between the chimney and the heating element. In response to a failure of the fan, heated fluid from the heating element converts through the chimney past the thermal fuse. The convection of the heated fluid increases a rate of heat transfer to the thermal fuse.

15 Claims, 7 Drawing Sheets

(56) References Cited

U.S. PATENT DOCUMENTS

| | | | |
|---|---|---|---|
| 6,167,193 A * | 12/2000 | Birdsell | F24H 3/0417 |
| | | | 219/506 |
| 6,375,304 B1 | 4/2002 | Aldrich et al. | |
| 8,164,849 B1 | 4/2012 | Szeremeta et al. | |
| 2009/0324276 A1 | 12/2009 | Kakutani | |
| 2011/0016898 A1 * | 1/2011 | Ghesquiere | F24H 9/2014 |
| | | | 62/238.7 |
| 2014/0024465 A1 | 1/2014 | Bodenweber | |
| 2014/0125750 A1 | 5/2014 | Sasaki et al. | |

FOREIGN PATENT DOCUMENTS

| | | |
|---|---|---|
| CN | 101806310 A | 8/2010 |
| CN | 101949503 A | 1/2011 |
| CN | 101949504 A | 1/2011 |
| CN | 101949505 A | 1/2011 |
| CN | 204332642 U | 5/2015 |
| EP | 0038308 | 10/1981 |
| EP | 0568181 | 5/1997 |
| EP | 1895827 A2 | 3/2008 |
| JP | H05303307 A | 11/1993 |
| RU | 2043704 | 9/1995 |

\* cited by examiner

CONVECTION SYSTEM

BACKGROUND

Printing devices eject printable fluid or other substances onto a print target in order to form an image or a structure on the print media. This deposition of material such as printing fluid or build material creates a physical copy of a digital representation of a two-dimensional image or a three-dimensional object, respectively. In one example, the document or object formed through the printing process may be dried to remove moisture from the paper or other portions of the printed document or object.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
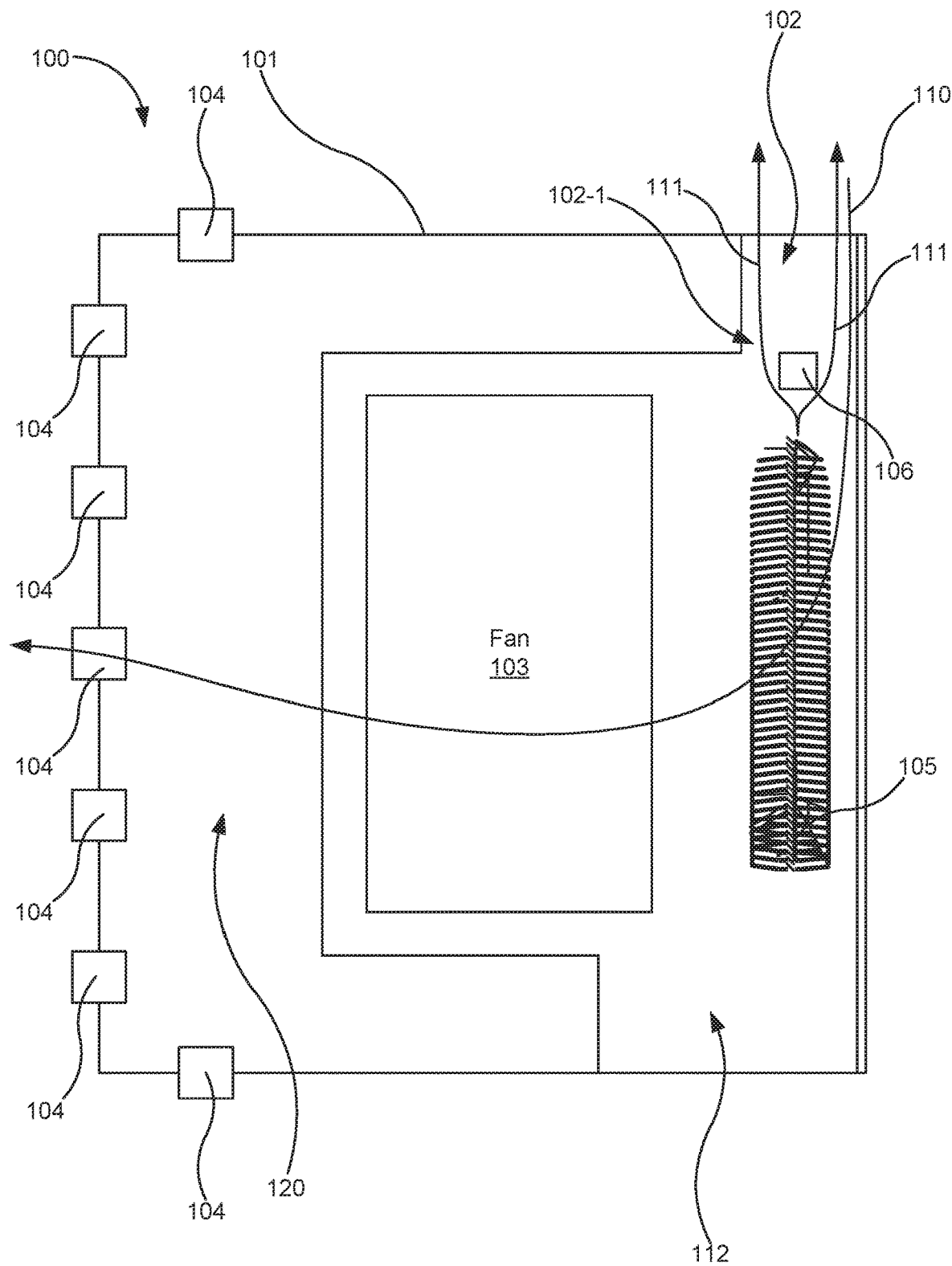
FIG. 1 is a block diagram of a convection system, according to one example of the principles described herein.

As mentioned above, the document or object formed through the printing process may be dried to remove moisture from the paper or other portions of the printed document or object. In one example, a convection system or other drying device may be used to remove the moisture. The convection system may include a number of heating elements that heat a fluid such as air. A fan may be used to force the heated fluid towards the printed document or object in order to remove the moisture. In some examples, the fan may move cooler ambient fluid located exterior to the convection system into the convection system and past the heating elements. In this manner, the fluid is forced across the heating elements an out the convection system.

In this example, the fan assists in maintaining the heating elements at a temperature at which surrounding portions of the convection system are not damaged or melted due to the heat from the heating elements. This is achieved by the fan continually drawing relatively cooler fluid into the convection system, the cooler fluid reducing the temperature of the heating elements. However, in some situations, the fan may fail or otherwise function improperly such that the fan fails to draw the cooler ambient fluid across the heating elements. In this situation, the heat produced by the heating elements may increase and damage elements surrounding the heating elements, and the heating elements may themselves be damaged through combustion or be subjected to a reduction reaction, or combinations thereof.

In situations where the heating elements may overheat, a thermal fuse may be included that, when tripped or otherwise activated, disconnects electrical power to the heating elements in order to eliminate the possibility that the heating elements overheat. However, the thermal fuses may not be tripped fast enough to ensure that damage to the heating elements and other elements surrounding the heating elements are not damaged. The use of relatively more sensitive thermal fuses may increase the cost of the convection system. Further the heating elements and other elements surrounding the heating elements may be made of materials that are less susceptible to melting, burning, or damage from higher temperatures. However, inclusion of these types of heat tolerant materials may further increase the cost of the convection system.

Examples described herein provide a convection system that includes a housing, a chimney and other fluid inlets defined in the housing to pass fluid into and out of the housing, and a fan rotatably coupled to the housing to create a pressure differential within the housing to pass the fluid into the housing. The convection system also includes a heating element located juxtaposition to the fan to heat the fluid passed into the housing via the chimney and other fluid inlets, and a thermal fuse located at an orifice of the chimney between the chimney and the heating element. In response to a failure of the fan, heated fluid from the heating element convects through the chimney past the thermal fuse. The convection of the heated fluid increases a rate of heat transfer to the thermal fuse. Further, convection of the heated fluid past the thermal fuse causes the thermal fuse to trip, and the thermal fuse, when tripped, deactivates the heating element. In one example, the convection system is atmospherically oriented above the heating element to convect the heated fluid through the chimney past the thermal fuse. The convection system further includes a number of fluid input channels to pass the fluid into the housing. Fluid passing into the housing via the chimney cools the thermal fuse to cause the thermal fuse to not trip. In this manner, the thermal fuse (106) is protected from accidently tripping, and allows a relatively more sensitive thermal fuse (106) with a lower tripping temperature to be used. In one example, the convection is coupled to a printing device, and the printing device is deactivated in response to a tripping of the thermal fuse.

In one example, the fan is a centrifugal fan. In this example, the centrifugal fan creates a pressure differential to force the heated fluid out of the housing. The heated fluid is forced out of the housing through a number of nozzles defined in the housing downstream from a number of fluid input channels that pass the fluid into the housing.

Examples described herein also provide a safety device for a convection system. The safety device includes a chimney defined in a housing to pass fluid into and out of the housing, and a number of thermal fuses located at an orifice of the chimney between the chimney and a number of heating elements. The thermal fuses, when tripped, deactivate the heating elements. In response to a non-failure of a fan associated with the heating elements, the safety device uses the fluid introduced into the housing via the chimney to cool the thermal fuses below a tripping temperature. This reduces or eliminates the possibility of the thermal fuse (106) accidently tripping. In response to a failure of the fan, the safety device uses heated fluid from the heating elements convecting through the chimney past the thermal fuses to increase a rate of heat transfer to the thermal fuses. In one example, the chimney is atmospherically oriented above the heating elements within the convection system to convect the heated fluid through the chimney past the thermal fuses. In one example, a printing device to which the convection system is associated may be deactivated in response to a tripping of the thermal fuses.

Examples described herein also provide a method of ensuring safety within a convection system. The method includes, with a fan creating a pressure differential within a housing, forcing a fluid past a heating element. In response to a failure of the fan, the method includes convecting heated fluid from the heating element through a chimney past a thermal fuse. The convection of the heated fluid increases the rate of heat transfer to the thermal fuse to trip the thermal fuse. The method further includes, in response to a tripping of the thermal fuse, deactivating the heating element. The method further includes, in response to a non-failure of the fan, using the fluid introduced to the fan via the chimney to cool the thermal fuse below a tripping temperature. Further the method may include deactivating a printing device to which the convection system is associated in response to a tripping of the thermal fuse.

As used in the present specification and in the appended claims, the term "fluid" is meant to be understood broadly as any substance that is capable of flowing and that changes its shape at a steady rate when acted upon by a force tending to change its shape. In one example, the fluid may be a liquid. In another example, the fluid may be a gas such as, for example, air.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to FIG. 1, FIG. 1 is a block diagram of a convection system (100), according to one example of the principles described herein. The convection system includes a housing (101). A number of fluid input channels are defined within the housing (101) including a chimney (102) through which ambient fluid such as air may enter the housing (101). The ambient fluid is drawn into the housing (101) using a fan (103). The fan (103) may include a centrifugal fan that creates a pressure differential within the housing (101) at the area (120) downstream from the fan (103) that causes the fluid drawn into the housing to be forced out a number of nozzles (104) defined in the housing (101) in order to move heated fluid toward an object that is to be heated or dried. The nozzles (104) are downstream from a number of fluid input channels (112) that pass the fluid into the housing (101).

A number of heating elements (105) heat the fluid drawn into the housing (101) by the fan (103). In one example, the heating elements (105) may be coils of wire or other metal structures through which an electrical current is placed to cause the metal to heat up due to the resistance of the metal. The heated metal, through thermal conduction, heats the surrounding environment including the fluid drawn into the housing (101) via the fan (103). In this manner, the relatively cooler fluid outside of the housing (101) that is drawn into the housing (101) by the fan (103) is heated to a relatively hotter temperature and forced out of the housing (101) via the nozzles (104) as indicated by arrow (110).

In the examples described herein, a thermal fuse (106) is included in the convection system (100). The thermal fuse (106) is placed juxtaposition to a first orifice (102-1) of the chimney (102) interior to the housing (101). As used in the present specification and in the appended claims, the term "juxtaposition," when used in connection with the thermal fuse (106), is meant to be understood broadly as position relative to the chimney (102) to allow for fluid passing through the chimney (102) to pass over or across the thermal fuse (106). The thermal fuse (106) may be any electrical safety device that interrupts electric current to the heating elements (105) when the thermal fuse (106) is heated to a predefined temperature. The thermal fuse (106) may be for one-time use or may be reset manually or automatically. In one example, a plurality of thermal fuses (106) may be included in the convection system (100).

As mentioned above, the thermal fuse (106) is located juxtaposition to the first orifice (102-1) of the chimney (102) interior to the housing (101). In one example, the thermal fuse (106) is placed at the first orifice (102-1) of the chimney (102) such that the most amount of surface area of the thermal fuse (106) is exposed to any fluid passing into and out of the housing (101) via the chimney (102). In this manner, the thermal fuse (106) is able to be exposed to as much of the fluid as passes into and out of the housing (101) via the chimney (102) as possible.

Thus, in one example, the convection system (100) includes a housing (101), a chimney (102) defined in the housing to pass fluid into and out of the housing (101), and a fan (103) rotatably coupled to the housing to create a pressure differential within the housing (101) at the area (120) downstream from the fan (103) to pass the fluid into the housing (101). The convection system (100) also includes a heating element (105) located juxtaposition to the fan to heat the fluid passed into the housing (101) via the chimney (102), and a thermal fuse (106) located at an orifice (102-1) of the chimney (102) between the chimney (102) and the heating element (105). In response to a failure of the fan (103), heated fluid from the heating element (105) convects through the chimney (102) past the thermal fuse (106). The convection of the heated fluid increases a rate of heat transfer to the thermal fuse (106).

As the fan (103) draws the relatively cooler fluid into the housing (101), this relatively cooler fluid passes over the thermal fuse (106) as indicated by arrow (110), and cools the thermal fuse (106). Fluid passing into the housing (101) via the chimney (102) cools the thermal fuse (106) to cause the thermal fuse (106) to not trip. Thus, as the fan (103) operates, the thermal fuse (106) is maintained at a temperature below an activation temperature of the thermal fuse (106) at which the thermal fuse (106) will trip.

In contrast, should the fan (103) cease to function properly or entirely, the fluid heated by the heating elements (105) will convect to the exterior of the housing (101) through the first orifice (102-1) of the chimney (102) as indicated by arrow (111). Convection of the heated fluid past the thermal fuse (106) causes the thermal fuse (106) to trip, and the thermal fuse (106), when tripped, deactivates at least one of the heating elements (105). In one example, the chimney (102) of the convection system (100) is atmospherically oriented such that the chimney (102) is located convectively above at least one of the heating elements (105) to convect the heated fluid through the chimney (102) past the thermal fuse (106).

As the heated fluid convects through the first orifice (102-1), the thermal fuse (106) is exposed to a steady stream of the heated fluid as indicated by arrows (111). Because of this increased exposure to the heated fluid, the thermal fuse (106) heats up more rapidly than it would in stagnate fluid or even heated stagnate fluid, and, in turn, trips more rapidly than in stagnate fluid or even heated stagnate fluid. Because the thermal fuse (106) is able to trip more rapidly, a less expensive thermal fuse with lower tolerances may be used. Further, because the thermal fuse (106) is able to trip more rapidly, a thermal event within the convection system (100) may be responded to more quickly. Use of a thermal fuse with a relatively higher activation temperature is more expensive and has a slower response time than the thermal fuse (103) and chimney (102) arrangement described herein. Thus, use of thermal fuse with a relatively higher activation temperature may result in damage to the heating elements (105), the convection system (100), and associated device such as a printing device, or may even start a generalized fire in the environment in which the convection system (100) is located. The thermal fuse (103) and chimney (102) arrangement described herein reduces or eliminates the possibility of such damage.

Still further, less expensive heat resistant materials may be used within the convection system since the threat that the heating elements will continue to heat up is reduced or eliminated. In some examples of a convection system, expensive heat resistant materials may be used in the housing (101), the fan (103), the fluid input channels in the housing (101) including the nozzles (104), and even the heating elements (105) themselves. The present thermal fuse (106) and associated chimney (102), and the position of the thermal fuse (106) with respect to the chimney (102) eliminates use of expensive heat resistant materials within the convection system (100), and reduces the overall cost to manufacture and sell the convection system (100).

In one example, the convection system (101) is coupled to a printing device. In this example, the printing device may also be deactivated in response to a tripping of the thermal fuse (106). However, the convection system (100) may be used in any scenario in which convection-assisted drying or heating may occur, and in systems that utilize convective airflow for heating but use a thermal protection mechanism to prevent overheating. Thus, the convection system (100) may be used in, for example, 2D printing, 3D printing, within convection ovens, within dryers, and other applications. More details regarding the convection system (100) will be described below.

Figure 2:
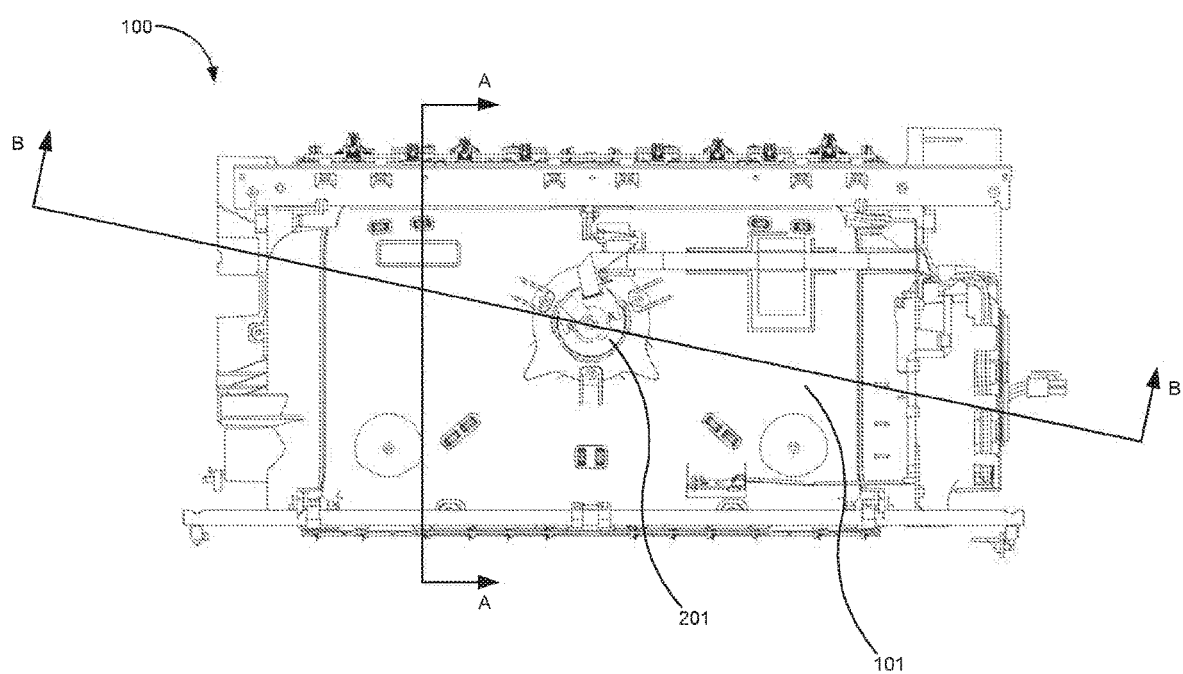
FIG. 2 is a diagram of a back portion of a convection system, according to one example of the principles described herein.
Figure 3:
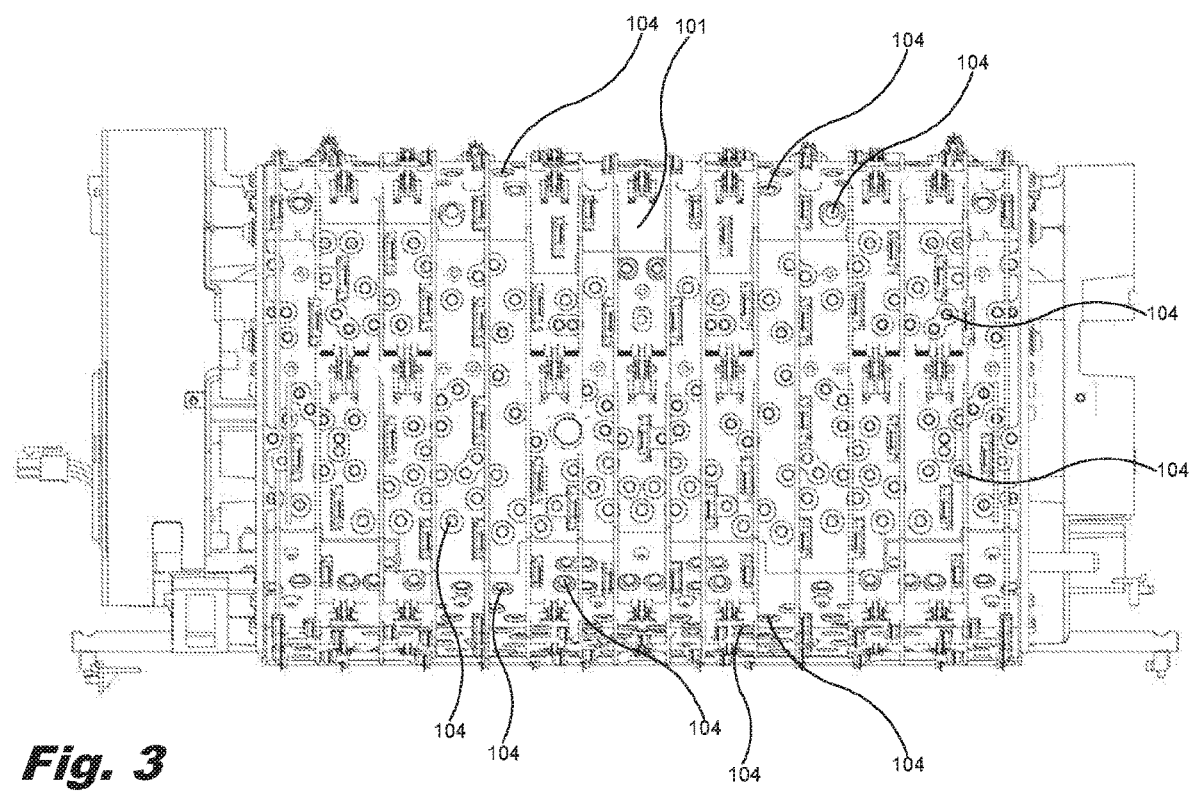
FIG. 3 is a diagram of a front portion of a convection system, according to one example of the principles described herein.

FIG. 2 is a diagram of a back portion of a convection system (100), according to one example of the principles described herein. The back portion of the convection system (100) is depicted in order to orient later figures. The convection system (100) of FIG. 2 includes a motor (201) to rotate the fan (103) included in the convection system (100). A portion of the housing (101) is also depicted in FIG. 2. FIG. 3 is a diagram of a front portion of a convection system (100), according to one example of the principles described herein. FIG. 3 depicts a portion of the housing (101) that faces the object within, for example, a printing device that is to be heated or dried. Thus, a number of nozzles (104) are defined in this portion of the housing (101) through which heated fluid flows from the interior of the convection system (100) toward the object to be heated or dried. Any number of nozzles (104) may be defined in the portion of the housing (101) depicted in FIG. 3, and although a few nozzles (104) are called out in FIG. 3, FIG. 3 actually depicts many more nozzles (104). In one example, at least forty nozzles (104) are included in the portion of the housing (101) depicted in FIG. 3. In another example, at least eighty nozzles (104) are included in the portion of the housing (101) depicted in FIG. 3. The number, placement, and orientation of the nozzles (104) in the portion of the housing (101) depicted in FIG. 3 may be based on the application of the convection system (100). The face of the housing (101) depicted in FIG. 3 is formed in a half-cylindrical shape as seen in, for example, FIG. 4. This causes nozzles (104) defined in the housing (101) to point in several directions along the curvature of the half-cylindrical shaped portion of the housing (101). However, the portion of the housing (101) including the nozzles (104) may have any shape as may fit an application.

Figure 4:
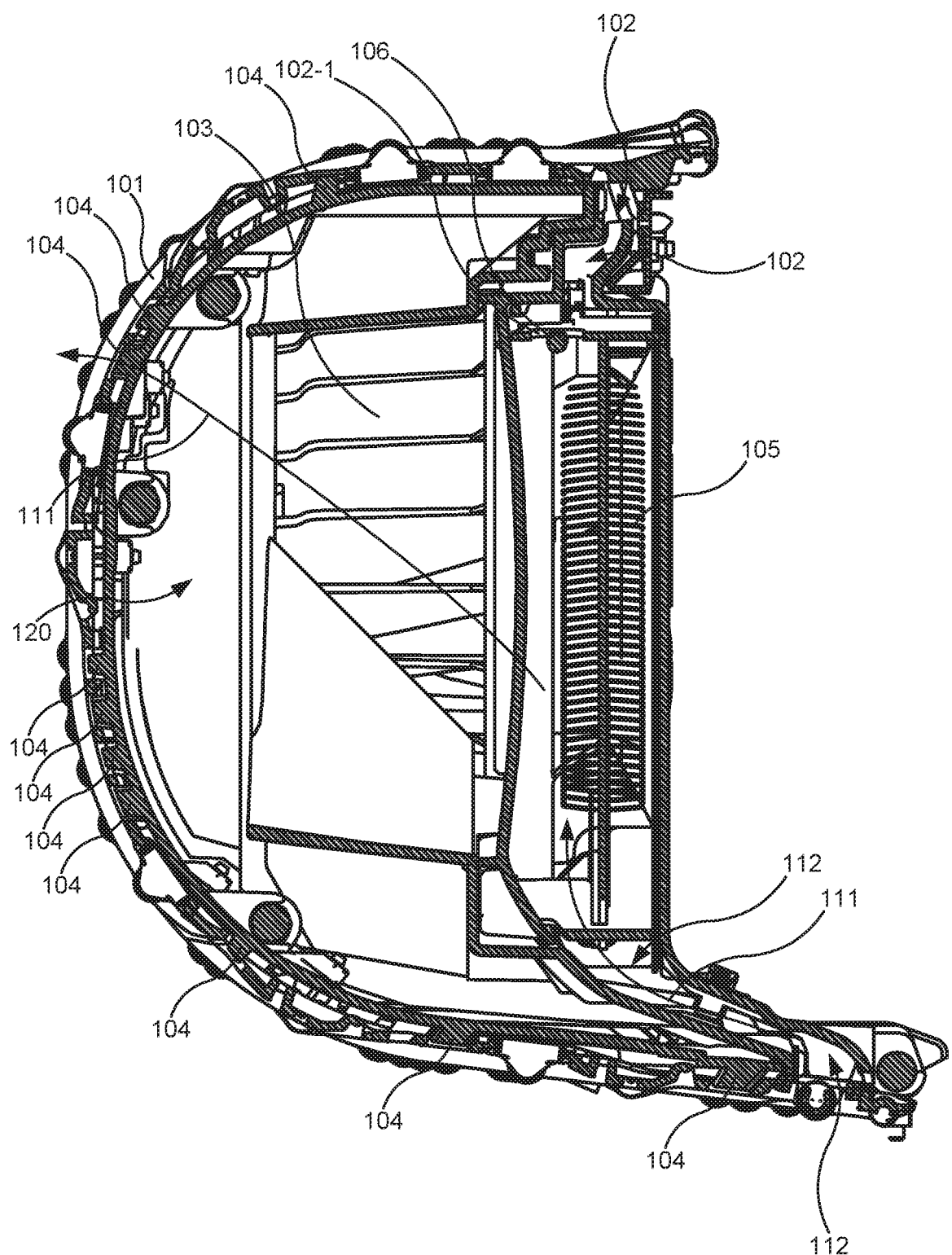
FIG. 4 is a diagram of a cutaway side view of the convection system of FIG. 2 along arrow A, according to one example of the principles described herein.
Figure 5:
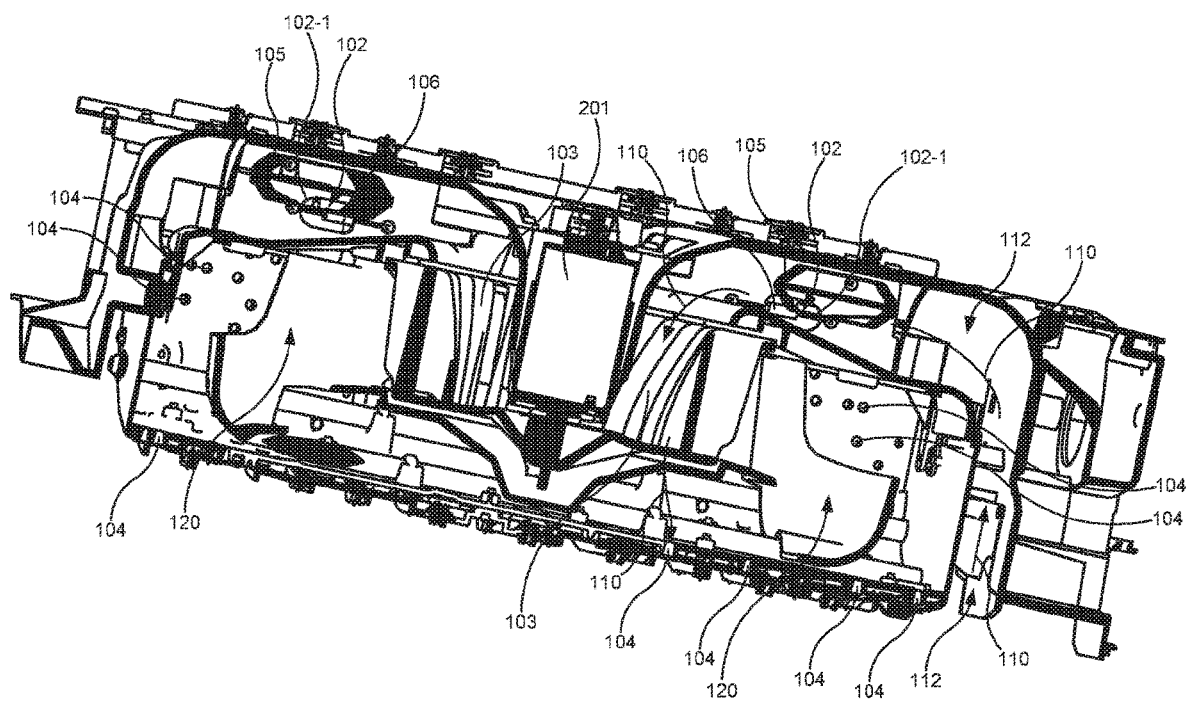
FIG. 5 is a diagram of a cutaway view of the convection system of FIG. 2 along arrow B, according to one example of the principles described herein.

FIGS. 4 and 5 will now be described together. FIG. 4 is a diagram of a cutaway side view of the convection system (100) of FIG. 2 along arrow A, according to one example of the principles described herein. FIG. 5 is a diagram of a cutaway view of the convection system (100) of FIG. 2 along arrow B, according to one example of the principles described herein. FIGS. 4 and 5 depict a number of fluid input channels (112) through which a large portion of the fluid drawn into the convection system (100) is obtained. Although FIG. 4 depicts one fluid input channel (112) and FIG. 5 depicts two fluid input channels (112), any number of input channels (112) may be included. A pathway of fluid travel through the fluid input channels (112) is indicated by arrows (111). Specifically, the cooler fluid from the exterior of the housing (101) is drawn into the housing (101) via the fan (103) through the fluid input channels (112), is heated by the heating elements (105) as it passes through and around the heating elements (105), enters the fan (103), exits the fan (103), and is forced out a number of nozzles (104) defined in the housing (101) on a side of the fan (103) opposite the heating elements (105). In this manner, the convection system (100) delivers heated air to, for example, a printing device to heat or dry an output of the printing device.

The chimney (102) acts a secondary fluid input channel. FIG. 4 depicts one of a number of chimneys (102) and one of a number of thermal fuses (106) located at the first orifice (102-1) of the chimney (102). FIG. 5 depicts two of a number of chimneys (102) and two of a number of thermal fuses (106) located at the first orifice (102-1) of the chimneys (102). In one example, the thermal fuse (106) is oriented juxtaposition to the first orifice (102-1) such that a maximum of the surface area of the thermal fuse (106) is exposed to a flow or convection of fluid around the thermal fuse (106). In the examples depicted in FIGS. 4 and 5, the thermal fuse (106) includes an approximately cylindrical cross-section, and is oriented to present a longitudinal side of the thermal fuse (106) to a flow of the fluid directly. Further, in one example, the thermal fuse (106) may be located approximately in the middle of the first orifice (102-1) so that a maximum amount of fluid flows around the thermal fuse (106). In these examples, the thermal fuse (106) is therefore exposed to a maximum amount of an external relatively cooler fluid or as much of a heated fluid from the heating elements as these types of fluids pass into and out of the housing (101) through the chimney (102) in order to protect the thermal fuse (106) from tripping or cause the thermal fuse (106) to trip more rapidly, respectively.

In one example, the chimney (102) may draw a less volume of fluid into the housing (101) relative to the fluid input channels (112). However, as described above, the fluid drawn into the housing (101) through the chimney (102) is used to cool the thermal fuse (106) to cause the thermal fuse to not trip. Because the fluid outside of the housing (101) is relatively cooler than the fluid that interacts with the heating elements (105), this cooler fluid reduces the temperature of the thermal fuse (106). Further, if the fan (103) stops drawing fluid into the housing (101) through the chimney (102), the fluid input channels (112), or a combination thereof, the fluid heated by the heating elements (105) convects through the chimney (102) past the thermal fuse (106) located at the first orifice (102-1) of the chimney (102), and causes the thermal fuse (106) to be exposed to a greater amount of heated fluid, and, in turn, causes the thermal fuse (106) to trip. The thermal fuses (106) are electrically coupled to the heating elements, and the tripping of the thermal fuses (106) deactivates at least one of the heating elements (105).

The fan (103) may stop drawing fluid into the housing (101) through the chimney (102), the fluid input channels (112), or a combination thereof in a number of ways. In one example, the motor (201) may fail. because the motor (201) rotates the fan (103), a failure of the motor (201) may result in slow or no movement of the fan (103). In another example, a controlling device such as an associated printing device may incorrectly instruct the motor (201) to stop rotating the fan (103). In still another example, the fan (103) itself including vanes or blades that may be broken such that the fan (103), although moving, may still not be able to move fluid though the convection system (100). Whatever the reason, the fan (103) may become unable to move fluid within the convection system (100). The function of the convection system (100) will now be described in more detail in connection with FIGS. 6 and 7.

Figure 6:
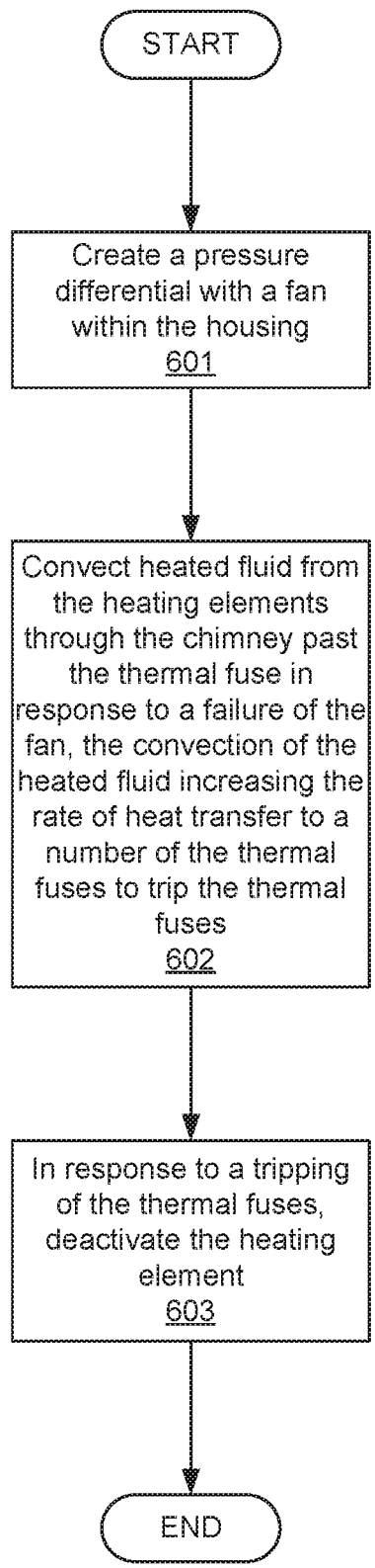
FIG. 6 is a flowchart showing a method of ensuring safety within a convection system, according to one example of the principles described herein.

FIG. 6 is a flowchart showing a method of ensuring safety within a convection system, according to one example of the principles described herein. The method of FIG. 6 may begin by creating (block 601) a pressure differential within the housing (101) at the area (120) downstream from the fan (103) using the fan (103). The pressure differential at area (120) forces the fluid past the number of heating elements (105). The method may further include convecting (block 602) heated fluid from the heating elements (105) through the chimney (102) past the thermal fuse (106) in response to a failure of the fan (103). The convection of the heated fluid increases the rate of heat transfer to a number of the thermal fuses (106) to trip the thermal fuses (106). In response to a tripping of the thermal fuses (106) the heating element may be deactivated (block 603). More details regarding ensuring safety within a convection system (100) will now be described in connection with FIG. 7.

Figure 7:
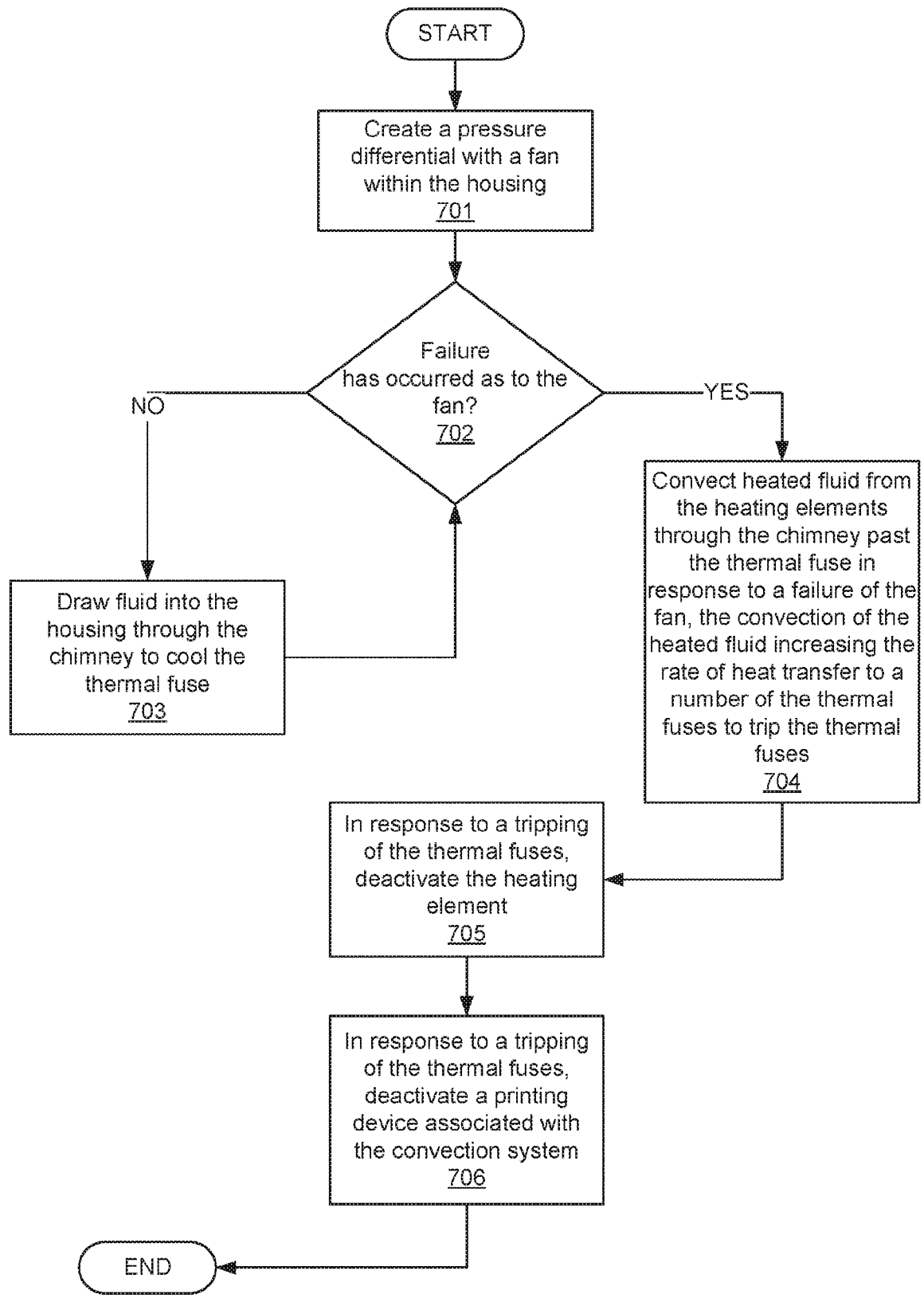
FIG. 7 is a flowchart showing a method of ensuring safety within a convection system, according to one example of the principles described herein.

FIG. 7 is a flowchart showing a method of ensuring safety within a convection system, according to one example of the principles described herein. The method of FIG. 7 may begin by creating (block 701) a pressure differential at area (120) with the fan (103) within the housing (101). The pressure differential at area (120) forces the fluid past the number of heating elements (105). A determination (block 702) is made as to whether a failure has occurred as to the fan (103) within the convection system (100). In response to a determination that the fan is functioning properly (block 702, determination NO), the convection system (100) draws (block 703) fluid into the housing (101) through the chimney (102) in order to cool the thermal fuse (106) to a temperature below an activation temperature of the thermal fuse (106) at which the thermal fuse (106) trips. The method may loop back to block 702 in order to continually make the determination of block 702.

In response to a determination that the fan not functioning (block 702, determination YES), the method may further include convecting (block 704) heated fluid from the heating elements (105) through the chimney (102) past the thermal fuse (106) in response to a failure of the fan (103). The convection of the heated fluid increases the rate of heat transfer to a number of the thermal fuses (106) to trip the thermal fuses (106). In response to a tripping of the thermal fuses (106) the heating element may be deactivated (block 705). Further, in one example, the convection system (100) deactivates (block 706) a printing device (200) associated with the convection system (100) in response to a tripping of the thermal fuses (106).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, a processor associated with the convection system (100), a processing device associated with a control device such as a printing device electrically coupled to the convection system (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a convection system that includes a housing, a chimney defined in the housing to pass fluid into and out of the housing, and a fan rotatably coupled to the housing to create a pressure differential within the housing to pass the fluid into the housing. The convection system also includes a heating element located juxtaposition to the fan to heat the fluid passed into the housing via the chimney, and a thermal fuse located at an orifice of the chimney between the chimney and the heating element. In response to a failure of the fan, heated fluid from the heating element convects through the chimney past the thermal fuse. The convection of the heated fluid increases a rate of heat transfer to the thermal fuse.

The convection system provides for a less expensive, more reliable system to ensure that a convection system is not damaged by heating elements (105) included therein. Examples described herein allow for thermal fuses with lower activation temperatures to be used instead of relatively more expensive thermal fuses with relatively higher activation temperatures which slow response time in preventing overheating. Further, examples described herein allow for the use of materials within the convection system with a relatively lower heat resistance since the risk of overheating is reduced or eliminated and because the overall heat to which the convection system is exposed is reduced due to a quicker response time in an overheating scenario. Further, examples described herein protect the thermal fuses from accidently tripping by allowing for a method by which the thermal fuses are cooled during operation.

The preceding description has been presented to illustrate and describe examples of the principles described. This description is not intended to be exhaustive or to limit these principles to any precise form disclosed. Many modifications and variations are possible in light of the above teaching.

What is claimed is:

1. A convection system comprising:
    a housing;
    a chimney defined in the housing to pass fluid into and out of the housing;
    a fan rotatably coupled to the housing to create a pressure differential within the housing to pass the fluid into the housing;
    a heating element located in juxtaposition to the fan to heat the fluid passed into the housing via the chimney; and
    a thermal fuse located at an orifice of the chimney between the chimney and the heating element,
    wherein, in response to a failure of the fan, heated fluid from the heating element convects through the chimney past the thermal fuse, the convection of the heated fluid to increase a rate of heat transfer to the thermal fuse.

2. The convection system of claim 1, wherein:
    convection of the heated fluid past the thermal fuse causes the thermal fuse to trip, and
    the thermal fuse, when tripped, deactivates the heating element.

3. The convection system of claim 1, wherein the convection system is atmospherically oriented above the heating element to convect the heated fluid through the chimney past the thermal fuse.

4. The convection system of claim 1, further comprising a number of fluid input channels to pass the fluid into the housing.

5. The convection system of claim 1, wherein fluid passing into the housing via the chimney cools the thermal fuse to cause the thermal fuse to not trip.

6. The convection system of claim 1, wherein:
    the convection system is coupled to a printing device, and
    the printing device is deactivated in response to a tripping of the thermal fuse.

7. The convection system of claim 1, wherein the fan is a centrifugal fan, the centrifugal fan creating a pressure differential to force the heated fluid out of the housing.

8. The convection system of claim 6, wherein the heated fluid is forced out of the housing through a number of nozzles defined in the housing downstream from a number of fluid input channels that pass the fluid into the housing.

9. A safety device for a convection system comprising:
    a chimney defined in a housing to pass fluid into and out of the housing;
    a number of thermal fuses located at an orifice of the chimney between the chimney and a number of heating elements, the thermal fuses to, when tripped, deactivate the heating elements,
    wherein, in response to a non-failure of a fan associated with the heating elements, using the fluid introduced into the housing via the chimney to cool the thermal fuses below a tripping temperature.

10. The safety device of claim 9, further comprising, in response to a failure of the fan, using heated fluid from the heating elements to convect through the chimney past the thermal fuses to increase a rate of heat transfer to the thermal fuses.

11. The safety device of claim 10, wherein the chimney is atmospherically oriented above the heating elements within the convection system to convect the heated fluid through the chimney past the thermal fuses.

12. The safety device of claim 9, wherein a printing device to which the convection system is associated is deactivated in response to a tripping of the thermal fuses.

13. A method of ensuring safety within a convection system comprising:
    with a fan creating a pressure differential within a housing, forcing a fluid past a heating element;
    in response to a failure of the fan:
        convecting heated fluid from the heating element through a chimney past a thermal fuse, the convection of the heated fluid increasing the rate of heat transfer to the thermal fuse to trip the thermal fuse; and
        in response to a tripping of the thermal fuse, deactivating the heating element.

14. The method of claim 13, further comprising, in response to a non-failure of the fan, using the fluid introduced to the fan via the chimney to cool the thermal fuse below a tripping temperature.

15. The method of claim 13, further comprising deactivating a printing device to which the convection system is associated in response to a tripping of the thermal fuse.

* * * * *